Patented May 26, 1936

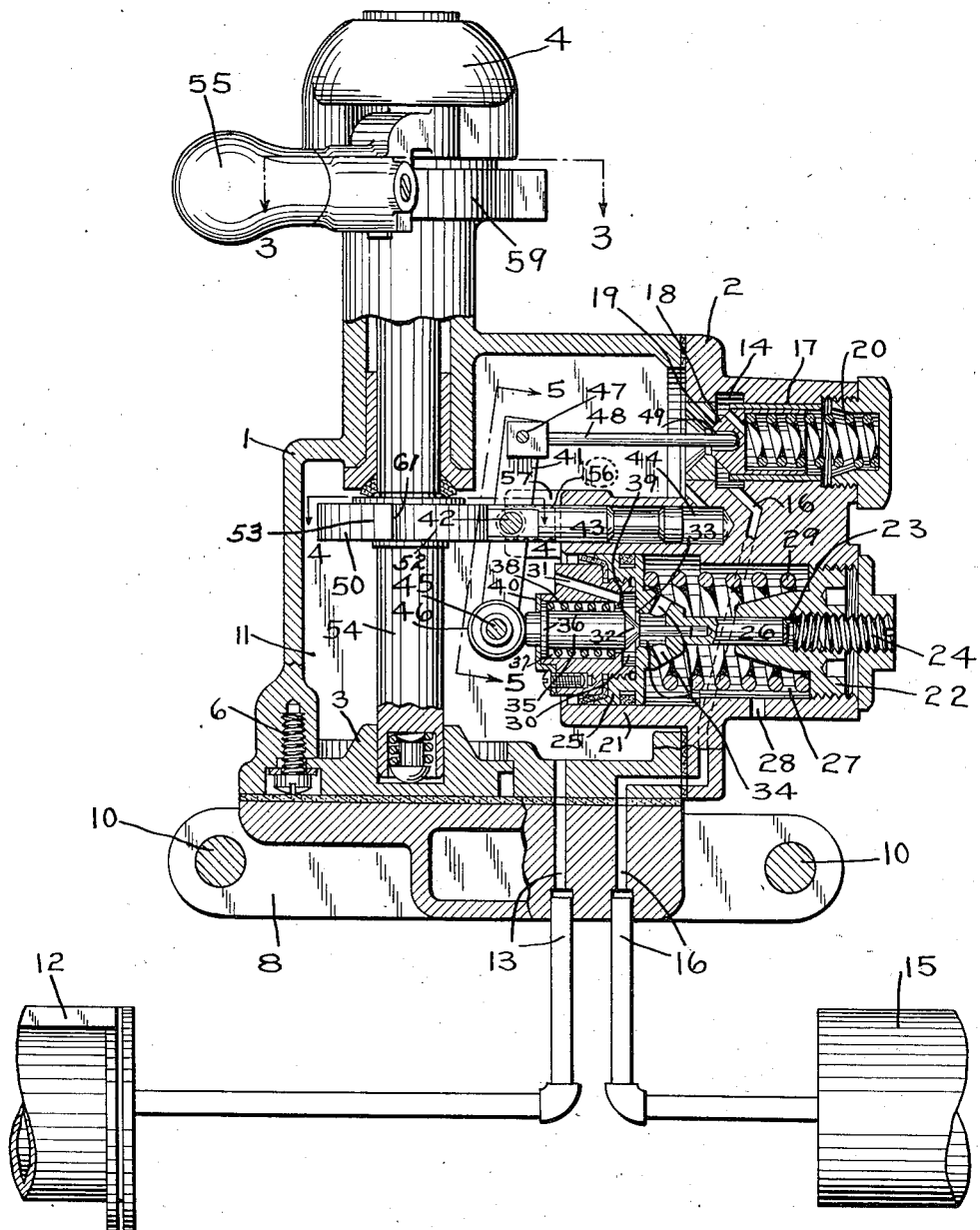

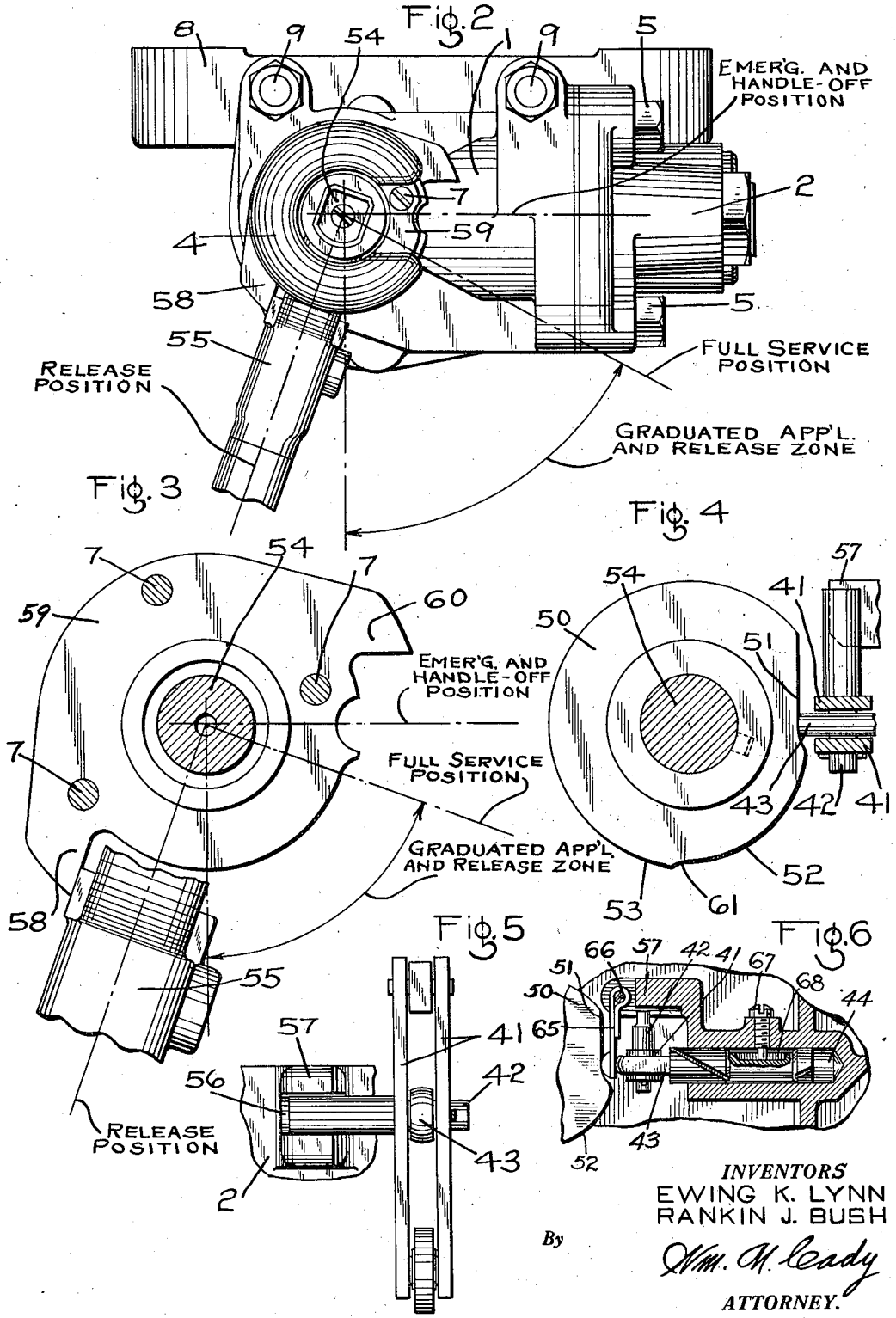

2,042,112

UNITED STATES PATENT OFFICE 2,042,112

BRAKE VALVE DEVICE

Ewing K. Lynn, East McKeesport, and Rankin J. Bush, Jeannette, Pa., assignors to The Westinghouse Air Brake Company, Wilmerding, Pa., a corporation of Pennsylvania Application October 16, 1931, Serial No. 569,158

48 Claims. (Cl. 303—54)

This invention relates to control valve devices for fluid pressure apparatus and more particularly to brake valve devices of the self-lapping type for use in controlling the operation of fluid pressure brake equipment.

In the self-lapping brake valve devices heretofore employed for controlling the operation of fluid pressure brake equipments to effect the application and release of the brakes, the manual power applied to the brake valve handle or lever to control the operation of the brake valve device is opposed by the usual heavy regulating spring and also by fluid at brake cylinder pressure acting on one side of a movable abutment such as a piston or a flexible diaphragm, so that it requires considerable manual effort to move the operating handle or lever to a brake applying position and to hold it in this position. This is objectionable in that it tends to tire the operator and also renders it difficult for the operator to accurately control the application and release of the brakes.

The principal object of our invention is to provide an improved self-lapping brake valve device which will be free of the above mentioned objectionable features.

Another object is to provide an improved self-lapping brake valve device which is very sensitive to variations in fluid pressures in controlling the application and release of the brakes and which is consequently operative to provide any desired brake cylinder pressure quickly and accurately.

Another object of the invention is to provide an improved self-lapping brake valve device in which the several parts thereof will be prevented from unintentionally moving to release position.

A further feature of our invention resides in the mounting of the major portion of the brake controlling mechanism of the brake valve device in a removable section of the brake valve casing, so that this section and mechanism as a unit may be removed from or applied to a fixed section of the casing.

A still further object of the invention is to provide a self-lapping control valve device in which the valve mechanism may be adjusted to provide a predetermined control pressure for any given position of the means for operating the valve mechanism.

Other objects and advantages will appear in the following more detailed description of the invention.

In the accompanying drawings; Fig. 1 is a detailed view mainly in section of a brake valve device embodying our invention, one form of brake equipment to which the device is applicable being shown diagrammatically; Fig. 2 is a plan view of the brake valve device; Fig. 3 is an enlarged detail sectional view taken on the line 3—3 of Fig. 1; Fig. 4 is an enlarged detail sectional view taken on the line 4—4 of Fig. 1; Fig. 5 is an end elevational view of a portion of the brake valve mechanism as viewed in the direction indicated by the line 5—5 of Fig. 1; and Fig. 6 is a fragmentary sectional view of a modification of a portion of the brake valve device.

As shown in the drawings, the brake valve device comprises a casing having a main section 1, a side section 2, a bottom section 3 and a handle guard section 4. The sections 2, 3 and 4 are removably secured to the main casing section by any desired means. For illustrative purposes, the casing section 2 is shown secured by bolts 5, the casing section 3 by set screws 6 and the casing section 4 by set screws 7. The casing section 1 is removably secured to a bracket 8 by any desired means, such for instance, as bolts 9, the bracket being secured to any desired supporting structure by bolts or rivets 10.

The casing sections 1, 2 and 3 when secured together in the manner just described, define a pressure chamber 11 which may be constantly in communication with the usual brake cylinder 12 through a passage and pipe 13.

The casing section 2 is provided with a chamber 14 with which the usual main reservoir 15 is in constant communication through a pipe and passage 16. Contained in the chamber and slidably mounted in a bushing 17 secured to the casing section 2 is a supply valve 18 which is adapted to seat on a valve seat 19 carried by the casing section 2 and which is subject on one side to the pressure of a coil spring 20. This valve is operative to control communication from the chamber 14 to the chamber 11.

The casing section 2 is provided with a cylinder 21 which is open at one end to the chamber 11, the other end of the cylinder being closed by an adjusting member 22 which has screw-threaded connection with the casing section. This adjusting member is provided with a central bore 23 which at its outer end is tapped to receive a screw-threaded stop member 24.

Operatively mounted in the cylinder 21, adjacent to its open end, is a movable abutment in the form of a piston 25 having a stem 26 which is slidably guided by the member 22 within the inner end of the bore 23. At one side of the piston 25 there is a chamber 27 which is constantly open to the atmosphere through a passage 28. Contained in the chamber 27 is a coil spring 29 which is interposed between and engages the inner face of the piston 25 and an inner face of the adjusting member 22.

Contained in a valve chamber 30 in the piston 25 which is open to the pressure chamber 11 through a passage 31, is an exhaust or release valve 32 which is adapted to seat on a valve seat 33 formed on the piston, and which is operative to control communication from the valve chamber 30 to the chamber 27 by way of connected passages 34 in the piston stem 26. The exhaust valve is provided with a stem 35 having a collar 36 which slidably engages the piston within a central bore 37 and is subject to the pressure of a light coil spring 38 interposed between and engaging the collar 36 and an annular flange 39 on the piston. Outward movement of the valve relative to the piston is limited by the collar 36 engaging a stop plate 40 secured to the piston. The outer end portion of the valve stem 35 extends through an opening in the stop plate, and beyond the outer face of the piston, is adapted to be operatively engaged by an operating mechanism which will now be described.

For controlling the operation of the supply and exhaust valves 18 and 32 respectively, we provide a mechanism comprising spaced levers 41 which are pivotally connected, intermediate their ends, to a pin 42 mounted in a plunger 43 which at one end is slidably guided by the casing section 2 within a bore 44.

At one side of the pivot pin 42 the ends of the levers 41 are connected together through the medium of a pin 45 and loosely mounted on the pin 45 and disposed between the levers is a roller 46 which is adapted to operatively engage the outer end of the exhaust valve stem 35. At the other side of the pivot pin 42, the ends of the levers are connected together by means of a pin 47 on which one end of an operating rod 48 is pivotally mounted, the opposite end of the rod operatively engaging one side of the supply valve 18 within a recess 49 formed in the valve.

For the purpose of controlling the operation of the plunger 43, a rotatable cam 50 is provided having peripheral cam surfaces 51, 52 and 53 adapted to operatively engage the outer end of the plunger. This cam is secured to an operating shaft 54 which is rotatably mounted in the casing sections 1 and 3. The operating shaft may be rotated through the medium of the usual removable handle 55.

The plunger 43 is preferably round in cross section and being loosely mounted in the casing section may tend to rotate axially. For the purpose of preventing such rotation, one end of the pivot pin 42 is adapted to engage the casing section 2 within an open ended slot 56 provided in a lug 57 of the section.

It will here be noted that when the several parts of the brake valve device are properly secured together, they may be applied to or removed from the bracket 8 as a unit. It will also be noted that, with the exception of the cam 50 and operating shaft 54, the operating mechanism of the brake valve device is carried by the casing section 2 and may be either applied to or removed from the main casing section 1, as a unit, with the casing section 2, thus facilitating the inspection, cleaning and repair of the mechanism.

With the brake valve handle 55 in release position, as shown in Figs. 1, 2 and 3, the operating cam 50 is also in release position as shown in Fig. 4. With the cam in this position, the outer end of the plunger may be either in contact with the cam surface 51, as shown in Fig. 4 or in close proximity to said surface. It will be noted that the cam in its release position may not exert any inward pressure on the plunger 43 so that the pressure of the spring 20 maintains the supply valve 18 seated and the pressure of the spring 38 maintains the exhaust valve 32 unseated.

With the exhaust valve unseated, the brake cylinder 12 is open to the atmosphere through pipe and passage 13, pressure chamber 11 in the brake valve device passage 31 in the piston 25, valve chamber 30, past the unseated valve 32, through passages 34 in the piston stem 26, spring chamber 27 and passage 28.

It will here be understood that both of the springs 38 and 20 are of less resistance than spring 29 so that exhaust valve 32 can be seated against the resistance of spring 38 without compressing spring 29 and when valve 32 is seated, the supply valve 18 can be unseated against the resistance of spring 20 without compressing spring 29.

To effect an application of the brakes, the brake valve handle 55 is moved in a counter-clockwise direction from release position, causing the shaft 54 and cam 50 to turn in the same direction. As the cam 50 is thus moved, the cam surface 52 engages and forces the plunger 43, and pivot pin 42 inwardly, i. e., toward the casing section 2. Since the spring 20, acting on one side of the supply valve 18, offers greater resistance to the inward movement of the levers 41 than does the spring 38, acting on the release valve 32, the supply valve 18 and rod 48, during the initial movement of the handle 55 toward application position, are maintained stationary, so that the pin 47 forms a stationary fulcrum for one end of the levers 41. Now as the plunger 43 and pin 42 are moved inwardly by the action of the cam 50, the levers 41 are caused to rock about the pin 47 in a counter-clockwise direction and as the levers are thus moved, the roller 46 moving therewith causes the exhaust valve 32 to be seated against the opposing pressure of the spring 38, thus closing the atmospheric communication from the chamber 11 in the brake valve device and consequently from the brake cylinder 12 to the atmosphere. The exhaust valve 32 is seated just before the handle 55 reaches the beginning of the graduated application and release zone.

When the release valve 32 is seated, the value of the spring 29 acting on the piston 25 being greater than the combined values of the springs 38 and 20, the piston 25 will remain stationary, so that the pin 45, at one side of the pin 42, now becomes the fulcrum for the levers 41, so that as the handle 55 is moved into the graduated application and release zone, the ends of the levers at the other side of the pin 45 will be caused to rock in a clockwise direction and, through the medium of the rod 48, cause the supply valve 18 to be unseated against the opposing pressure of the spring 20 and fluid under pressure in the valve chamber 14, supplied from the main reservoir 15 through pipe and passage 16, flows to the brake cylinder 12 through pressure chamber 11 in the brake valve device and passage and pipe 13, thus effecting an application of the brakes.

Now when the pressure of fluid in pressure chamber 11 acting on one side of the piston 25 is slightly greater than the opposing pressure of the spring 29 acting on the other side of the piston, the piston will move inwardly which, in the present embodiment of the invention, is in a direction toward the right hand.

As the piston 25 is thus being moved, the action of the spring 20 causes the supply valve 18 to move toward its seat 19. Through the medium of the rod 48, the action of the valve 18 causes the levers 41 to rock about the pivot pin 42 in a counter-clockwise direction maintaining the exhaust valve 32 closed. Now when the supply valve 18 seats on the valve seat 19, the further flow of fluid under pressure from the main reservoir to the chamber 11 is closed off and the inward movement of the piston is stopped by the action of the spring 29. Since the piston 25 is brought to a stop at substantially the same time as the supply valve 18 seats, the spring 20 acting through the medium of the rod 48, pin 47, levers 41, pin 45, roller 46 and exhaust valve stem 35 will maintain the exhaust valve 32 seated. Thus the brake valve device is automatically operated to lap the supply valve while holding the exhaust valve closed.

If, when the several parts of the brake valve device have been moved to lap position as just described, it is desired to reduce brake cylinder pressure, the brake valve handle 55 is moved, in a clockwise direction, to another position in the graduated application and release zone. As the handle is thus being moved the cam surface 52 of the cam 50 tends to gradually recede from the end of the plunger 43, permitting the spring 38 to act to unseat the exhaust valve 32, the valve 32 as it is being unseated rocking the levers 41 in a clockwise direction about the pin 47, which is maintained stationary by the resistance offered by the spring 29 through the medium of the supply valve 18 and the rod 48.

With the exhaust valve 32 thus unseated, fluid under pressure is released from the brake cylinder 12 to the atmosphere through pipe and passage 13, chamber 11 in the brake valve device, passage 31 and discharge valve chamber 30 in the piston 25, past the unseated discharge valve 32, through passages 34 in the piston stem 26, spring chamber 27 and passage 28. As the pressure of fluid in chamber 11 reduces, the spring 29 acts to move the piston 25 outwardly, i. e., in a direction toward the left hand and with the cam 50 held stationary in the desired application position and the plunger 43 consequently held against outward movement, the exhaust valve 32 is maintained stationary and the piston will move into seating engagement with the valve, thus closing off the further release of fluid under pressure from the chamber 11 and consequently from the brake cylinder. This movement of the piston 25 relative to the exhaust valve 32 causes the spring 38 to be compressed.

With the valve 32 seated, the release of fluid under pressure from the brake cylinder 12 and pressure chamber 11 is closed off, consequently the piston 25 will come to a stop without rocking the levers 41 to unseat the supply valve 18, thus the brake valve device is automatically lapped after a reduction in brake cylinder pressure has been effected.

To effect a complete release of the brakes, the handle 55 is returned to release position, moving the cam 50 to its release position, the handle being stopped in release position by its engagement with a limiting stop 58 of a quadrant 59 integral with the casing section 1. As the cam is being moved to this position, the action of the spring 38 causes the exhaust valve 32, carried by the piston 25, to be unseated as before described, permitting fluid under pressure to flow from the chamber 11 and brake cylinder 12 to the atmosphere. As the pressure of fluid in chamber 11 reduces, the piston 25 is caused to move outwardly by the action of the spring 29. The unseated exhaust valve 32 now moves forward with the piston causing the levers 41 to rock in a clockwise direction about the pin 47.

Through the medium of the pin 42, this movement of the levers causes the plunger 43 to move longitudinally toward the cam 50 to substantially the position in which it is shown in Fig. 4. Since the supply valve 18 is maintained seated and the exhaust valve unseated the brake cylinder 12 is open to the atmosphere, consequently the complete release of the brakes is effected.

To effect a straight air emergency application of the brakes, the handle 55 may be moved from release position or any service application position to emergency and handle off position, in which latter position, the handle is brought to a stop by its engagement with a stop lug 60 of the quadrant 59. This movement of the handle causes the cam 50 to be rotated in a counterclockwise direction and just after the handle moves past full service position, a portion 61 of the cam surface 52 engages and forces the plunger inwardly, i. e. toward the right hand until such time as the surface 53 of the cam 50 is in engagement with the plunger. When the surface 53 is in engagement with the plunger, said plunger will have been moved some distance beyond the position it assumes in effecting a full service application of the brakes. This additional movement causes the supply valve 18 to be moved further from its seat than in service.

Now as the pressure in the chamber 11 increases, the piston 25 moves inwardly until it is brought to a stop by the engagement of the stop member 24 with the end of the piston stem 26. As the piston is thus moving, the exhaust valve 32 is maintained seated by the pressure of the spring 20 transmitted to the valve through the medium of the supply valve 18, rod 48, pin 47, levers 41, pin 45 and roller 46. With the piston stopped in its innermost position and the exhaust valve 32 seated, no further movement of the levers 41 about the pin 42 is possible, consequently the supply valve 18 is maintained unseated, permitting the pressure of fluid in the main reservoir 15 to equalize into the brake cylinder thus insuring a high brake cylinder pressure in a straight air emergency application of the brakes.

To release a straight air emergency application of the brakes, the cam 50 is rotated, through the medium of the handle 55 and shaft 54, in a clockwise direction and as the portion 61 of the cam surface 52 passes the outer end of the plunger 43, the spring 20 acting through the medium of the supply valve 18 and connections therefrom to the plunger, causes the plunger to move inwardly and follow the contour of the portion 61 of the cam surface 52, permitting the supply valve 18 to seat and close communication from the main reservoir to the chamber 11. Now as the handle 55 is moved to release position the several parts of the brake valve device will operate in the same manner as before described to effect the complete release of the brakes.

The maximum brake cylinder pressure which can be obtained in effecting a full service application of the brakes is determined by the pressure exerted on one side of the piston 25 by the regulating spring 29 and it is for the purpose of varying the pressure of this spring to that desired that the adjusting member 22 is provided.

To adjust the regulating spring 29 so as to provide the brake cylinder pressure desired, the brake valve handle may be turned to full service position in which fluid under pressure is supplied from the main reservoir 15 to the pressure chamber 11 and brake cylinder 12. When the pressure of fluid in the chamber becomes slightly greater than the pressure of the spring 29, the several parts of the brake valve device move automatically to lap position as before described. Now if the brake cylinder pressure is higher than that desired, the adjusting member 22 is rotated in a counter-clockwise direction reducing the pressure of the spring 29. As the pressure of the spring is thus reduced the pressure of fluid in the chamber 11 causes the piston 25 to move inwardly, drawing the exhaust valve seat away from the exhaust valve 32, said valve being maintained stationary by the action of the spring 38. With the valve seat thus moved away from the valve 32, fluid under pressure flows from the chamber 11 to the atmosphere. When the desired fluid pressure is obtained the person adjusting the brake valve device ceases to rotate the member 22, whereupon the spring 29 acts to move the piston forwardly into seating engagement with the exhaust valve 32 closing communication from the chamber 11 to the atmosphere. The spring 29 is now adjusted to provide the desired maximum brake cylinder pressure in all subsequent full service brake applications.

If, on the other hand, the brake cylinder pressure is lower than that desired, the adjusting member 22 is rotated in a clockwise direction and increases the pressure of the spring 29. As the adjusting member is thus being turned the spring 29 acts to move the piston outwardly against the opposing pressure of fluid in the chamber 11 carrying the seated exhaust valve with it. Through the medium of the exhaust valve, the movement of the piston causes the levers 41 to be rocked in a clockwise direction about the pivot pin 42, unseating the supply valve 18 against the opposing pressure of the spring 20. Fluid under pressure now flows from the main reservoir 15 to the chamber 11. When the desired brake cylinder pressure is obtained the person adjusting the brake valve device ceases to rotate the member 22 whereupon fluid under pressure in the chamber 11 causes the piston 25 to move inwardly permitting the spring 20 to act to seat the supply valve 18, the spring 20 also acting to maintain the exhaust valve 32 seated against the opposing pressure of the spring 38. The spring is now adjusted to provide the desired maximum brake cylinder pressure in all subsequent full service applications of the brakes.

In the event of the breakage of the spring 29 the operator may, if the power of the spring is entirely lost, move the brake valve handle 55 to emergency position, in which the exhaust valve 32 is postively held seated and the supply valve 18 is positively held unseated in the same manner as described in connection with the effecting of a straight air emergency application of the brakes, thus rendering it possible to effect an application of the brakes.

It will here be noted that if the spring 29, when broken, is still capable of offering resistance to the inward movement of the piston 25 by fluid under pressure supplied to the chamber 11 when the brake valve handle 55 is moved to any brake applying position in the graduated application and release zone, the several parts of the brake valve device will operate to effect an application of the brakes, the maximum brake cylinder pressure obtainable in the full service position of the handle being determined by the pressure exerted on the piston 25 by the broken spring.

The handle guard section 4 of the brake valve casing is adapted to so cooperate with the handle 55 that the handle can only be removed from the operating shaft 54 when the handle is off position, thus insuring an application of the brakes before the handle can be removed.

In Fig. 6 of the drawings a modification of a portion of the control valve device is illustrated in which the cam 50, instead of directly engaging with the outer end of the plunger 43, engages a member 65 which is pivotally mounted on a pin 66 secured to the casing, which member in turn engages the outer end of the plunger. The member 65 is interposed between the cam and outer end of the plunger for the purpose of preventing the cam, as it is rotated, from exerting a side thrust on the plunger and thereby prevents any tendency of the plunger to bind in the casing due to the action of the cam.

Further in this modification, the plunger 43 is locked to the casing by a set screw 67 which has screw-threaded engagement with the casing and which extends into a groove 68 formed in the plunger. This connection, while it permits limited movement between the plunger and the casing section 2 prevents the accidental separation of the plunger from the casing section 2 when this casing section separates from the casing section 1.

From the foregoing description it will be understood that we have provided an improved self lapping brake valve device in which the manual force required to control the operation of the device to effect an application of the brakes is neither opposed by the pressure of the comparatively heavy regulating spring 29 or by the pressure of the fluid supplied to the chamber 11 and the brake cylinder 12, the only opposition to such force being offered by the light springs 20 and 38 and the negligible frictional resistance offered by the several moving parts. It will also be understood that when the brake valve handle 55 is operated to any brake application position, it will, due to the contour of the cam surface 32, remain in this position until such time as it is desired to change the position of the handle to either increase or decrease brake cylinder pressure.

While two illustrative embodiments of our invention have been described in detail, it is not our intention to limit its scope to these embodiments or otherwise than by the terms of the appended claims.

Having now described our invention, what we claim as new and desire to secure by Letters Patent, is:

1. In a controlling valve device for fluid pressure equipment, the combination with a casing having a chamber through which fluid under pressure is adapted to be supplied to and released from said equipment, of valve means operable to effect either an increase or a decrease in the pressure of fluid in said chamber, a member slidably mounted in said casing, a lever carried by said member and movable to various positions for controlling the operation of said valve means to supply fluid under pressure to and release fluid under pressure from said chamber, a spring, a movable abutment subject to the opposing pressures of said spring and chamber adapted to cooperate with said valve means to limit either the supply of fluid under pressure to or the release of fluid under pressure from said chamber according to the adjusted position of said lever, and means for controlling the movement of said member and thereby the movement of said lever.

2. In a controlling valve device for fluid pressure equipment, the combination with a casing having a chamber through which fluid under pressure is adapted to be supplied to and released from said equipment, of valve means for controlling the supply of fluid under pressure to and the release of fluid under pressure from said chamber, a lever for controlling the operation of said valve means, and means operable manually and means operable according to the pressure of fluid in said chamber and an opposing control pressure transmitted to the means independently of said lever for controlling the operation of said lever, each of said means cooperating with said lever at a different point along the length of the lever.

3. In a controlling valve device for fluid pressure equipment, the combination with a casing having a chamber through which fluid under pressure is adapted to be supplied to and released from said equipment, of valve means for controlling the supply of fluid under pressure to and the release of fluid under pressure from said chamber, a lever for controlling the operation of said valve means, and means operable manually and means operable according to the pressure of fluid in said chamber and an opposing control pressure transmitted to the means independently of said lever for controlling the operation of said lever, the manually operable means cooperating with said lever intermediate the ends of the lever and the fluid pressure controlled means cooperating with one end of the lever.

4. In a controlling valve device for fluid pressure equipment, the combination with a casing having a chamber through which fluid under pressure is adapted to be supplied to and released from said equipment, of valve means for controlling the supply of fluid under pressure to and the release of fluid under pressure from said chamber, a lever for controlling the operation of said valve means, and means for controlling the operation of said lever, said means comprising a manually operated member cooperating with the lever intermediate the ends of the lever and pressure sensitive means cooperating with one end of the lever and subject on one side to the pressure of fluid in said chamber and on the opposite side to an opposing pressure transmitted thereto independently of the lever.

5. In a controlling valve device for fluid pressure equipment, the combination with a casing having a chamber through which fluid under pressure is adapted to be supplied to and released from said equipment, of valve means operable to effect an increase in the pressure of fluid in said chamber and also operable to effect a decrease in the pressure of fluid in the chamber, a lever operable to control the operation of said valve means, resilient means opposing the operation of said valve means to increase the pressure of fluid in the chamber, means operated manually for controlling the operation of said lever, and means operated according to the pressure of fluid in said chamber for also controlling the operation of said lever, the operation of the manually operable means, to effect an increase in the pressure of fluid, being opposed only by the pressure of said resilient means as transmitted through said lever.

6. In a controlling valve device for fluid pressure equipment, the combination with a casing having a chamber through which fluid under pressure is adapted to be supplied to and released from said equipment, of valve means operable to effect an increase in the pressure of fluid in said chamber and also operable to effect a decrease in the pressure of fluid in the chamber, a lever operable to control the operation of said valve means, spring means yieldably resisting movement of said valve means to a position to increase the pressure of fluid in said chamber, means operated manually for controlling the operation of said lever, and means operated according to the pressure of fluid in said chamber for also controlling the operation of said lever, the operation of the manually operable means, to effect an increase in the pressure of fluid, being subjected only to the pressure of said spring means as transmitted through the medium of said lever.

7. In a controlling valve device for fluid pressure equipment, the combination with a casing having a chamber through which fluid under pressure is adapted to be supplied to and released from said equipment, of valve means operable to effect an increase in the pressure of fluid in said chamber and also operable to effect a decrease in the pressure of fluid in the chamber, a lever operable to actuate said valve means to effect an increase in the pressure of fluid in said chamber and operable to effect the operation of said valve means to effect a decrease in the pressure of fluid in said chamber, means operated manually for effecting the operation of said lever to control said valve means, and means separate from the manually operated means and operated according to the pressure of fluid in said chamber and an opposing control pressure transmitted to the means independently of said lever for controlling the operation of said lever to effect the operation of said valve means to limit the pressure of fluid in said chamber.

8. In a controlling valve device for fluid pressure equipment, the combination with a casing having a chamber through which fluid under pressure is adapted to be supplied to and released from said equipment, of valve means operable to effect an increase in the pressure of fluid in said chamber, and also operable to effect a decrease in the pressure of fluid in the chamber, a lever operable to control the operation of said valve means to increase or decrease the pressure of fluid in said chamber, means operated manually to operate said lever to actuate said valve means to effect an increase in the pressure of fluid in said chamber, means separate from said manually operated means operable by fluid under pressure in said chamber for effecting the operation of said lever and thereby said valve means to limit the pressure of fluid in said chamber according to the pressure exerted on the lever by the manually operated means.

9. In a controlling valve device for fluid pressure equipment, the combination with a casing having a chamber through which fluid under pressure is adapted to be supplied to and released from said equipment, of valve means for controlling the supply of fluid under pressure to and the release of fluid under pressure from said chamber, a lever adapted to operate automatically to control the operation of said valve means, means operated manually for initiating the automatic operation of said lever, and pressure regulating means separate from said manually operated means cooperating with said valve means and lever and operated according to the pressure of fluid in said chamber and an opposing control pressure transmitted to the regulating means independently of said lever for causing the valve means to function to either limit the supply of fluid under pressure to or the release of fluid under pressure from said chamber according to the operation of the manually operated means.

10. In a controlling valve device for fluid pressure equipment, the combination with a casing having a chamber through which fluid under pressure is adapted to be supplied to and released from said equipment, of valve means for controlling the supply of fluid under pressure to and the release of fluid under pressure from said chamber, a floating lever operable to control the operation of said valve means, means operated manually for controlling the operation of said lever, pressure regulating means separate from the manually operated means operated according to the pressure of fluid in said chamber and an opposing control pressure transmitted to the regulating means independently of said lever and cooperating with said valve means and lever for limiting the pressure of fluid in said chamber according to the operation of the manually operated means, and means for adjusting said regulating means to provide any desired maximum fluid pressure in said chamber for any given position of the manually operated means.

11. In a fluid pressure controlling valve device, the combination with an operating cam, a normally open exhaust valve, a normally closed supply valve, a lever operatively engaging said valves and movable by said cam when the cam is rotated in one direction to first close said exhaust valve and to then open said supply valve, means opposing the opening of said supply valve, and an abutment opposing, through the medium of said exhaust valve and lever, the pressure of said means while the supply valve is being opened, said abutment being operable, by fluid under pressure supplied by said supply valve, out of opposition with said means to permit said means to act to close said supply valve and to operate said lever to maintain the exhaust valve closed.

12. In a fluid pressure controlling valve device, the combination with an operating cam, a normally open exhaust valve, a normally closed supply valve, a lever operatively engaging said valves and movable by said cam when the cam is rotated in one direction to first close said exhaust valve and to then open said supply valve, means opposing the opening of said supply valve, an abutment opposing, through the medium of said exhaust valve and lever, the pressure of said means while the supply valve is being opened, said abutment being operable by fluid under pressure supplied by said supply valve, out of opposition with said means to permit said means to act to close said supply valve and to operate said lever to maintain the exhaust valve closed, and means for limiting the movement of said abutment.

13. In a fluid pressure controlling valve device, the combination with an operating cam, a normally open exhaust valve, a normally closed supply valve, a lever operatively engaging said valves and movable by said cam when the cam is rotated in one direction to first close said exhaust valve and to then open said supply valve, means opposing the opening of said supply valve, an abutment opposing, through the medium of said exhaust valve and lever, the pressure of said means while the supply valve is being opened, said abutment being operable, by fluid under pressure supplied by said supply valve, out of opposition with said means to permit said means to act to close said supply valve and to operate said lever to maintain the exhaust valve closed, and a spring opposing the movement of said abutment.

14. In a fluid pressure controlling valve device, the combination with a casing having a pressure chamber, a normally open exhaust valve establishing communication from said chamber, a normally closed supply valve, a member slidably engaging said casing, a lever carried by said member and engaging said valves and movable by said member relative to said supply valve for closing the exhaust valve and then movable relative to the exhaust valve to open said supply valve, manually operable means for operating said member, and an abutment movable by fluid under pressure in said chamber and cooperating with said lever to control the closing of said supply valve to limit the supply of fluid under pressure to said chamber, said lever being operable by the manually operable means to maintain said supply valve open and the exhaust valve closed to render said abutment ineffective to limit the supply of fluid under pressure to the chamber.

15. In a controlling valve device for fluid pressure equipment, the combination with a casing having a chamber through which fluid under pressure is adapted to be supplied to and released from said equipment, of a spring, a piston subject to the opposing pressures of said spring and chamber for regulating the pressure of fluid in the chamber, an exhaust valve mounted in and carried by said piston, a supply valve mounted in said casing at a point remote from said piston and disposed in parallel relation to said exhaust valve, a member for controlling the operation of said valves and means operable manually for controlling the operation of said member.

16. In a controlling valve device for fluid pressure equipment, the combination with a casing having a chamber through which fluid under pressure is adapted to be supplied to and released from said equipment, of a spring, a piston subject to the opposing pressures of said spring and chamber for regulating the pressure of fluid in the chamber, an exhaust valve mounted in said piston, a supply valve mounted in said casing and disposed in parallel relation to said exhaust valve, a pivoted member for controlling the operation of said valves, and means operable manually for controlling the operation of said member.

17. In a controlling valve device for fluid pressure equipment, the combination with a casing having a chamber through which fluid under pressure is adapted to be supplied to and released from said equipment, of a spring, a piston subject to the opposing pressures of said spring and chamber for regulating the pressures of fluid in the chamber, an exhaust valve mounted in said piston, a supply valve mounted in said casing and disposed in parallel relation to said exhaust valve, a rocking beam for controlling the operation of said valves, and means operable manually for controlling the operation of said beam.

18. In a controlling valve device for fluid pressure equipment, the combination with a casing having a chamber through which fluid under pressure is adapted to be supplied to and released from said equipment, of a normally open exhaust valve, a normally closed inlet valve, a member operatively engaging both of said valves, means operated manually for moving said member to first close said exhaust valve and to then open said inlet valve, a spring opposing the opening movement of said inlet valve, and means cooperating with said member to resist the opposing pressure of said spring during the opening movement of the inlet valve and movable by fluid under pressure, admitted to said chamber past the open inlet valve, out of resisting relation with said spring for permitting the spring to act to close the inlet valve.

19. In a controlling valve device for fluid pressure equipment, the combination with a casing having a chamber through which fluid under pressure is adapted to be supplied to and released from said equipment, of a normally open exhaust valve, a normally closed inlet valve, a member operatively engaging both of said valves, means operated manually for moving said member to first close said exhaust valve and to then open said inlet valve, a spring opposing the opening movement of said inlet valve, and means cooperating with said member to resist the opposing pressure of said spring during the opening movement of the inlet valve and movable by fluid under pressure, admitted to said chamber past the open inlet valve, out of resisting relation with said spring for permitting the spring to act to close the inlet valve, and to operate said lever to maintain said exhaust valve seated.

20. In a controlling valve device for fluid pressure equipment, the combination with a casing having a chamber through which fluid under pressure is adapted to be supplied to and released from said equipment, of a normally open exhaust valve, a normally closed inlet valve, a member operatively engaging both of said valves, means operated manually for moving said member to first close said exhaust valve and to then open said inlet valve, a spring opposing the opening movement of said inlet valve, means cooperating with said member to resist the opposing pressure of said spring during the opening movement of the inlet valve and movable by fluid under pressure, admitted to said chamber past the open inlet valve, out of resisting relation with said spring for permitting the spring to act to close the inlet valve, and a spring resisting movement of the last mentioned means.

21. In a controlling valve device for fluid pressure equipment, the combination with a casing having a chamber through which fluid under pressure is adapted to be supplied to and released from said equipment, of an exhaust valve, a spring normally maintaining said valve open, an inlet valve, a spring normally maintaining said inlet valve closed, a member engaging said valves and operative upon the application of pressure thereto in one direction to close said exhaust valve against the opposing pressure of the exhaust valve spring and to open said inlet valve against the opposing pressure of the inlet valve spring, a movable abutment directly resisting the pressure of the exhaust valve spring and through the medium of said exhaust valve and member resisting the pressure of the inlet valve spring, said abutment being movable by fluid under pressure, admitted to said chamber past the open inlet valve, out of resisting relation with the inlet valve spring to permit said inlet valve spring to act to close said inlet valve and to actuate said member to maintain the exhaust valve seated.

22. In a controlling valve device for fluid pressure equipment, the combination with a casing having a chamber through which fluid under pressure is adapted to be supplied to and released from said equipment, of an exhaust valve, a spring normally maintaining said valve open, an inlet valve, a spring normally maintaining said inlet valve closed, a member engaging said valves and operative upon the application of pressure thereto in one direction to close said exhaust valve against the opposing pressure of the exhaust valve spring and to open said inlet valve against the opposing pressure of the inlet valve spring, a movable abutment directly resisting the pressure of the exhaust valve spring and through the medium of said exhaust valve and member resisting the pressure of the inlet valve spring, said abutment being movable by fluid under pressure, admitted to said chamber past the open inlet valve, out of resisting relation with the inlet valve spring to permit said inlet valve spring to act to close said inlet valve and to actuate said member to maintain the exhaust valve seated, said member operating upon the relief of pressure thereon to permit the exhaust valve spring to act to open the exhaust valve to release fluid under pressure from said chamber, and a spring acting to move said abutment into seating engagement with the exhaust valve to close off the release of fluid under pressure from said chamber.

23. In a controlling valve device for fluid pressure equipment, the combination with a casing having a chamber through which fluid under pressure is adapted to be supplied to and released from said equipment, of valve mechanism for supplying fluid under pressure to said chamber, for releasing fluid under pressure from said chamber and for automatically limiting the supply and release of fluid to and from said chamber, means operated manually to various positions throughout a predetermined zone to control the automatic operation of said mechanism and operated to a position outside of said zone for rendering said mechanism inoperative to limit the pressure of fluid in said chamber.

24. In a controlling valve device for fluid pressure equipment, the combination with a casing having a chamber through which fluid under pressure is adapted to be supplied to and released from said equipment, of valve mechanism for supplying fluid under pressure to said chamber, for releasing fluid under pressure from said chamber and for automatically limiting the supply and release of fluid to and from said chamber, means operated manually to various positions throughout a predetermined zone to control the automatic operation of said mechanism and operated to a position outside of said zone for maintaining said valve mechanism in fluid supplying position.

25. In a controlling valve device for fluid pressure equipment, the combination with a casing having a chamber through which fluid under pressure is adapted to be supplied to and released from said equipment, of valve mechanism for supplying fluid under pressure to said chamber, for releasing fluid under pressure from said chamber and for automatically limiting the supply and release of fluid to and from said chamber, means operated manually to various positions throughout a predetermined zone to control the automatic operation of said mechanism and operated to a position outside of said zone for positively operating said mechanism to constantly supply fluid under pressure to said chamber.

26. In a controlling valve device for fluid pressure equipment, the combination with a casing having a main section adapted to be secured to a supporting structure and also having a section removably carried by said main section, said casing sections defining a control chamber through which fluid under pressure is adapted to be supplied to and released from said equipment, of valve mechanism carried by the removable casing section operable for supplying fluid to said chamber, for releasing fluid from the chamber and for automatically limiting either the supply of fluid to or the release of fluid from the chamber, a lever for controlling the operation of the valve mechanism, and means operatively mounted in the main casing section for controlling the operation of said lever and valve mechanism, said lever, valve mechanism and removable casing section being secured together as a unit and being removable from said main casing section as a unit.

27. A brake valve device comprising a casing having a chamber, a spring, a movable abutment subject to the opposing pressures of said spring and said chamber for regulating the pressure of fluid in the chamber, an inlet valve for controlling the supply of fluid under pressure to said chamber, an exhaust valve for controlling the release of fluid from said chamber, one of said valves seating in said abutment, a lever pivotally connected to the inlet valve and to the exhaust valve, and manually controlled means for operating said lever to actuate said valves.

28. A brake valve device comprising a casing having a chamber, a spring, a movable abutment subject to the opposing pressures of said spring and said chamber for regulating the pressure of fluid in the chamber, an inlet valve for controlling the supply of fluid under pressure to said chamber, an exhaust valve for controlling the release of fluid from said chamber, one of said valves seating in said abutment, a lever pivotally connected to the inlet valve and to the exhaust valve, and manually controlled means acting on said lever at a point intermediate the pivotal connections to the valves for operating said lever to thereby actuate said valves.

29. A brake valve device comprising a casing having a chamber, a spring, a movable abutment subject to the opposing pressures of said spring and said chamber for regulating the pressure of fluid in the chamber, an inlet valve for controlling the supply of fluid under pressure to said chamber, an exhaust valve for controlling the release of fluid from said chamber, said exhaust valve seating in said abutment, a lever pivotally connected to the inlet valve and to the exhaust valve, and manually controlled means for operating said lever to actuate said valves.

30. A brake valve device comprising a casing having a chamber, a spring, a movable abutment subject to the opposing pressures of said spring and said chamber for regulating the pressure of fluid in the chamber, an inlet valve for controlling the supply of fluid under pressure to said chamber, an exhaust valve for controlling the release of fluid from said chamber, one of said valves seating in said abutment, a member movably carried by said casing, a lever pivotally connected to said member and pivotally connected to the inlet valve and to the exhaust valve, and manually controlled means for operating said member and thereby said lever to actuate said valves.

31. A brake valve device comprising a casing having a chamber, a spring, a movable abutment subject to the opposing pressures of said spring and said chamber for regulating the pressure of fluid in the chamber, an inlet valve for controlling the supply of fluid under pressure to said chamber, an exhaust valve for controlling the release of fluid from said chamber, one of said valves seating in said abutment, a member slidably mounted in the casing, means for locking said member to the casing, a lever pivotally connected to said member and pivotally connected to the inlet valve and to the exhaust valve, and manually controlled means for operating said member and thereby said lever to actuate said valves.

32. A brake valve device comprising a casing having a chamber, a spring, a movable abutment subject to the opposing pressures of said spring and said chamber for regulating the pressure of fluid in the chamber, an inlet valve for controlling the supply of fluid under pressure to said chamber, an exhaust valve for controlling the release of fluid from said chamber, one of said valves seating in said abutment, a member movably carried by said casing, a lever pivotally connected to said member and pivotally connected to the inlet valve and to the exhaust valve, a member pivotally connected to the casing for controlling the operation of the first mentioned member, and manually operated means for controlling the operation of the second mentioned member.

33. A brake valve device comprising a casing having a chamber, a spring, a movable abutment subject to the opposing pressures of said spring and chamber for regulating the pressure of fluid in the chamber, a normally seated inlet valve operative to supply fluid under pressure to said chamber, an exhaust valve carried by said abutment normally establishing a communication through which said chamber is open to the atmosphere and operative to close said communication, and a manually controlled tiltable member successively fulcrumed at different points along its length for operating said valves, said exhaust valve being movable relative to said inlet valve until the exhaust valve closes said communication upon the tilting of the member in one direction and said inlet valve being movable relative to the exhaust valve to supply fluid under pressure to the chamber upon the tilting of the member in the opposite direction after the exhaust valve has closed said communication.

34. A brake valve device comprising a casing having a chamber, a spring, a movable abutment subject to the opposing pressures of said spring and chamber for regulating the pressure of fluid in the chamber, said abutment having an exhaust passage through which said chamber is adapted to communicate with the atmosphere, an exhaust valve carried by said abutment for controlling communication through said passage, an inlet valve operative to control the supply of fluid under pressure to said chamber, and a lever contained in said chamber operative to first move the exhaust valve relative to the inlet valve to close the communication through said passage and to then move the inlet valve relative to the exhaust valve to supply fluid under pressure to the chamber.

35. A brake valve device comprising a casing having a chamber, a spring, a movable abutment subject to the opposing pressures of said spring and chamber for regulating the pressure of fluid in the chamber, said abutment having an exhaust passage through which said chamber is adapted to communicate with the atmosphere, an exhaust valve carried by said abutment for controlling communication through said passage, an inlet valve operative to control the supply of fluid under pressure to said chamber, and a member tiltable in one direction to first move the exhaust valve relative to the inlet valve to close the communication through said passage and then tiltable in the opposite direction to move the inlet valve relative to the exhaust valve to supply fluid under pressure to the chamber and operative upon the movement of the piston by fluid under pressure supplied to said chamber to permit the inlet valve to close off the flow of fluid to the chamber.

36. A brake valve device comprising a casing having a chamber, a spring, a movable abutment subject to the opposing pressures of said spring and chamber for regulating the pressure of fluid in the chamber, said abutment having an exhaust passage through which said chamber is adapted to communicate with the atmosphere, an exhaust valve carried by said abutment for controlling communication through said passage, an inlet valve operative to control the supply of fluid under pressure to said chamber, and a member tiltable in one direction to first move the exhaust valve relative to the inlet valve to close the communication through said passage and then tiltable in the opposite direction to move the inlet valve relative to the exhaust valve to supply fluid under pressure to the chamber and tiltable upon the movement of the piston by fluid under pressure supplied to said chamber to permit the inlet valve to close off the flow of fluid to the chamber, said member being also tiltable to permit the exhaust valve to move relative to the abutment for venting fluid under pressure from said chamber by way of said passage.

37. A brake valve device comprising a casing having a chamber, a spring, a movable abutment subject to the opposing pressures of said spring and chamber for regulating the pressure of fluid in the chamber, said abutment having an exhaust passage through which said chamber is adapted to communicate with the atmosphere, an exhaust valve carried by said abutment for controlling communication through said passage, an inlet valve operative to control the supply of fluid under pressure to said chamber, and a member tiltable in one direction to first move the exhaust valve relative to the inlet valve to close the communication through said passage and then tiltable in the opposite direction to move the inlet valve relative to the exhaust valve to supply fluid under pressure to the chamber, and tiltable upon the movement of the piston by fluid under pressure supplied to said chamber to permit the inlet valve to close off the flow of fluid to the chamber, said means being also tiltable to permit the exhaust valve to move relative to the abutment for venting fluid under pressure from said chamber by way of said passage, and said abutment being movable by said spring, upon the venting of fluid from the chamber, into seating engagement with said valve for closing off the flow of fluid from said chamber.

38. In a controlling valve device for fluid pressure equipment, the combination with a casing having a chamber through which fluid under pressure is adapted to be supplied to and released from said equipment, of valve means operable to control the supply of fluid under pressure to and the release of fluid under pressure from said chamber, a regulating spring, a movable abutment subject to the opposing pressures of the spring and chamber, a tiltable member controlled manually for effecting the operation of said valve means to vary the pressure of fluid in said chamber and thereby control the operation of said abutment and controlled according to the operation of said abutment for effecting the operation of said valve means to limit either the supply of fluid under pressure to or the release of fluid under pressure from said chamber, the manual operation of said member to control the operation of the valve means being unopposed by the action of said regulating spring.

39. In a controlling valve device for fluid pressure equipment, the combination with a casing having a chamber through which fluid under pressure is adapted to be supplied to and released from said equipment, of valve means operable to control the supply of fluid under pressure to and the release of fluid under pressure from said chamber, a regulating spring, a movable abutment subject to the opposing pressures of the spring and chamber, a tiltable member controlled manually for effecting the operation of said valve means to vary the pressure of fluid in said chamber and thereby control the operation of said abutment and controlled according to the operation of said abutment for effecting the operation of said valve means to limit either the supply of fluid under pressure to or the release of fluid under pressure from said chamber, the manual operation of said member to control the operation of the valve means being unopposed by the pressure of said regulating spring or the pressure of fluid in said chamber.

40. In a controlling valve device for fluid pressure equipment, the combination with a casing having a chamber through which fluid under pressure is adapted to be supplied to and released from said equipment, of valve means operable to control the supply of fluid under pressure to and the release of fluid under pressure from said chamber, a regulating spring, a movable abutment subject to the opposing pressures of the spring and chamber, a tiltable member controlled manually for effecting the operation of said valve means to vary the pressure of fluid in said chamber and thereby control the operation of said abutment and controlled according to the operation of said abutment for effecting the operation of said valve means to limit either the supply of fluid under pressure to or the release of fluid under pressure from said chamber, the manual operation of said member to control the operation of the valve means being unopposed by said abutment.

41. In a controlling valve device for fluid pressure equipment, the combination with a casing having a chamber through which fluid under pressure is adapted to be supplied to and released from said equipment, of valve means operable to control the supply of fluid under pressure to and the release of fluid under pressure from said chamber, a regulating spring, a movable abutment subject to the opposing pressures of the spring and chamber, a tiltable member contained in said chamber and controlled manually for effecting the operation of said valve means to vary the pressure of fluid in said chamber and thereby control the operation of said abutment and controlled according to the operation of said abutment for effecting the operation of said valve means to limit either the supply of fluid under pressure to or the release of fluid under pressure from said chamber, the manual operation of said member to control the operation of the valve means being unopposed by the action of said abutment.

42. In a controlling valve device for fluid pressure equipment, the combination with a casing having a chamber through which fluid under pressure is adapted to be supplied and released from said equipment, of valve means for controlling the supply of fluid under pressure to and the release of fluid under pressure from said chamber, a lever adapted to operate automatically for controlling the operation of said valve means, manually operable means at one side of the lever for initiating the automatic operation of the lever, and means disposed at the other side of the lever and subject to the pressure of fluid in the chamber and an opposing control pressure transmitted thereto independently of said lever for controlling the automatic operation of the lever according to the manual control of the lever.

43. In a control valve device for controlling the supply of fluid under pressure to and the release of fluid under pressure from a fluid pressure equipment, in combination, a casing having a control chamber in communication with the equipment, valve means for controlling the supply of fluid under pressure to and the release of fluid under pressure from the chamber and equipment, a lever for controlling the operation of said valve means, means operable manually and means operable according to the pressure of fluid in said chamber and an opposing control pressure transmitted to the means independently of the lever for controlling the operation of the lever, each of said means cooperating with the lever at a different point along the length of the lever.

44. In a control valve device for controlling the supply of fluid under pressure to and the release of fluid under pressure from a fluid pressure equipment, in combination, a casing having a control chamber in communication with the equipment, valve means operable to effect an increase in the pressure of fluid in the chamber and equipment and also operable to effect a decrease in the pressure of fluid in the chamber and equipment, a lever operable to control the operation of said valve means to increase or decrease the pressure of fluid in the chamber and equipment, means operated manually to operate said lever to actuate said valve means to effect an increase in the pressure of fluid in the chamber and equipment, means separate from said manually operated means operable by fluid under pressure in said chamber for effecting the operation of said lever and thereby the valve means to limit the pressure of fluid in the chamber and equipment according to the pressure exerted on the lever by the manually operated means.

45. In a control valve device for controlling the supply of fluid under pressure to and the release of fluid under pressure from a fluid pressure equipment, in combination, a casing having a control chamber in communication with the equipment, a normally open exhaust valve establishing communication from the chamber and equipment, a normally closed supply valve, a movable guide member engaging said casing, a lever carried by said guide member and engaging said valves and movable by said guide member relative to the supply valve for closing the exhaust valve and then movable relative to the exhaust valve to open the supply valve, manually operable means for operating the guide member, and an abutment movable by fluid under pressure in said chamber and cooperating with the lever to control the closing of the supply valve to limit the supply of fluid under pressure to the chamber and equipment, said lever being operable by the manually operable means to maintain the supply valve open and the exhaust valve closed to render said abutment ineffective to limit the supply of fluid under pressure to the chamber and equipment.

46. In a control valve device for controlling the supply of fluid under pressure to and the release of fluid under pressure from a fluid pressure equipment, in combination, a casing having a control chamber in communication with the equipment, valve mechanism for supplying fluid under pressure to the chamber and equipment, for releasing fluid under pressure from the chamber and equipment and for automatically limiting the supply and release of fluid under pressure to and from the chamber and equipment, means operated to various positions throughout a predetermined zone to control the automatic operation of said mechanism and operated to a position outside of said zone for rendering said mechanism inoperative to limit the pressure of fluid in the chamber and equipment.

47. In a controlling valve device for fluid pressure equipment, in combination, a casing having a chamber which is in communication with the equipment, valve means operable to control the supply of fluid under pressure to and the release of fluid under pressure from the equipment and thereby control the pressure of fluid in said chamber, a control pressure exerting means, a movable abutment subject to the opposing pressures of the control means and chamber, a tiltable member controlled manually for effecting the operation of said valve means to vary the pressure of fluid in the equipment and chamber and thereby control the operation of the abutment for effecting the operation of the valve means to limit either the supply of fluid under pressure to or the release of fluid under pressure from the equipment and chamber, the manual operation of the valve means being unopposed by said abutment.

48. In a controlling valve device for fluid pressure equipment, in combination, a casing having a chamber which is in communication with the equipment, valve means operable to control the supply of fluid under pressure to and the release of fluid under pressure from the equipment and thereby control the pressure of fluid in said chamber, a control pressure exerting means, a movable abutment subject to the opposing pressures of the control means and chamber, a tiltable member controlled manually for effecting the operation of said valve means to vary the pressure of fluid in the equipment and chamber and thereby control the operation of the abutment for effecting the operation of the valve means to limit either the supply of fluid under pressure to or the release of fluid under pressure from the equipment and chamber, the operation of said lever being unopposed by the pressure of fluid in said chamber.

EWING K. LYNN.
RANKIN J. BUSH.